March 31, 1959 P. J. MARINO ET AL 2,879,672
QUICK ERECTING MEANS FOR GYRO VERTICALS
Filed Aug. 22, 1957 2 Sheets-Sheet 1

INVENTORS
PAUL J. MARINO
JOSEPH G. SUBBIONDO
BY
Herbert H. Thompson
ATTORNEY

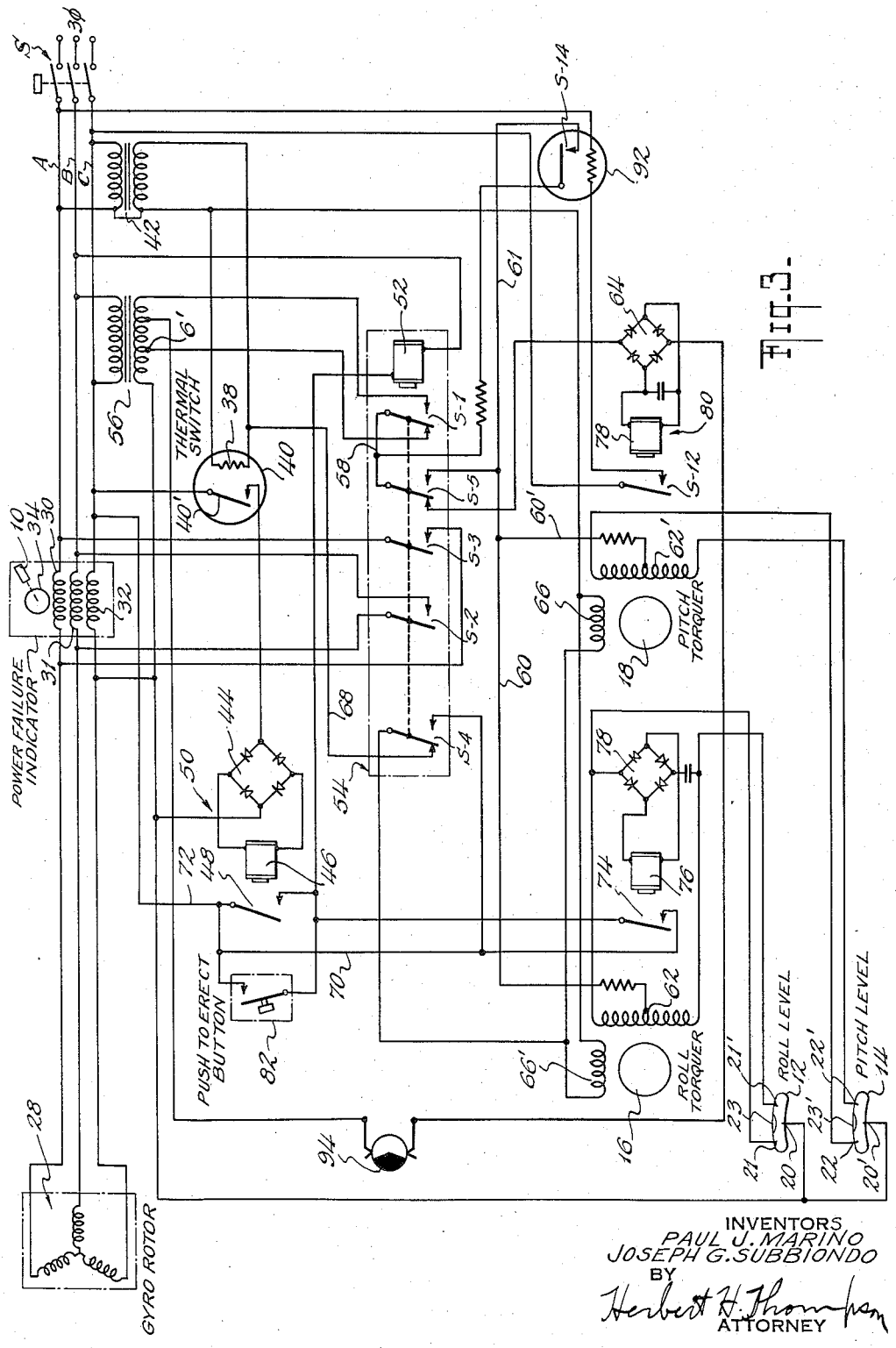

United States Patent Office 2,879,672
Patented Mar. 31, 1959

2,879,672

QUICK ERECTING MEANS FOR GYRO VERTICALS

Paul J. Marino, Island Park, and Joseph G. Subbiondo, Brooklyn, N.Y., assignors to Sperry Rand Corporation, Great Neck, N.Y., a corporation of Delaware Application August 22, 1957, Serial No. 679,578

5 Claims. (Cl. 74—5.47)

This invention relates to gyro verticals for aircraft and other vehicles in which means are provided for quickly erecting the same when starting up or in case the gyro is tumbled or badly disturbed during flight. For this purpose, we prefer to employ a timed cycle of operation by which the gyro is quickly brought up to speed and quickly erected without nutation, and returned to the normal erection rate automatically after the gyro has reached the vertical. We prefer also to provide a means for warning the aviator not to rely on the gyro vertical in case it is in a quick erection mode of operation.

After the gyro is erected at least about the roll axis, the normal erection rate is restored automatically. We have found that it is unnecessary to provide a separate means to delay restoration of the normal rate until the gyro is erected about the pitch axis because it has been found that the gyro will usually be erected about the pitch axis before it is erected about the roll axis. This is partly because the gyro usually has a lesser inclination in pitch rather than in roll when starting up and also because for a given erection torque the erection rate is greater about the pitch axis during starting up because the erection is assisted about this axis by the gimbal mounting of the gyro and the acceleration of the rotor during this period.

Our invention also provides means for preventing the turn control cutout of erection employed as a turn error preventing means from itself causing error of the gyroscope in case the craft is yawing rapidly, i.e., banking in one direction and then the other. In this case, an erection turn cutout such as a switch actuated by the roll of the craft of more than a few degrees will keep cutting in and out the erection device when the gyro would otherwise not be seriously disturbed and impair the normal erection. To prevent this, we provide a delayed action device between the turn control cutout and the erection torquers so that normal erection is not affected by rapid yawing or rolling of the craft in opposite directions but is only cut out when roll in the same direction continues for an appreciable period.

In many respects, this invention may be considered to be an improvement over the prior patent application of J. M. Jessup, Serial No. 686,723 filed September 27, 1957 for Erection Devices for Gyroscope.

We also provide a means whereby the pilot may initiate a fast erection rate at any time by pushing a button which puts the fast erection cycle into operation and discontinues it as soon as the gyro becomes level, at least about the roll axis.

Referring to the drawings,

Fig. 3 is a wiring diagram showing the several cycles of operation of the invention.

Figure 1:
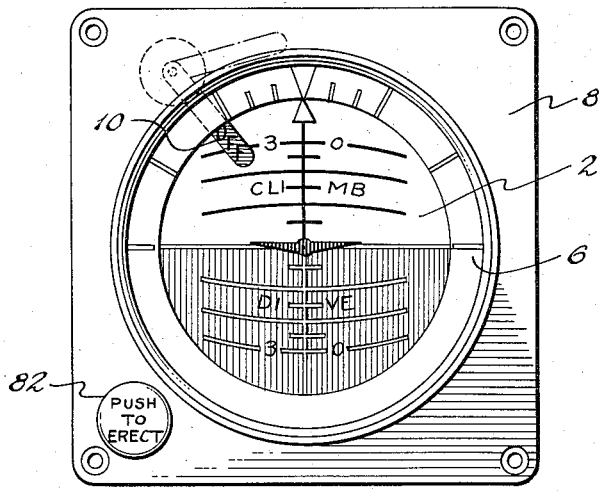
Fig. 1 is a face view of an attitude indicator containing our gyro vertical.
Figure 2:
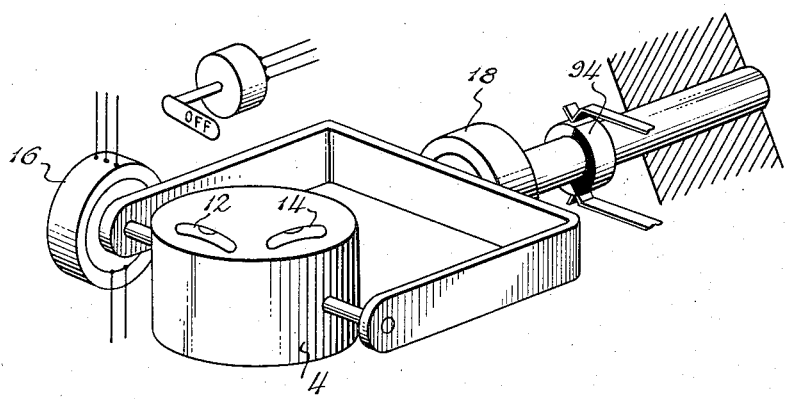
Fig. 2 is a perspective view of the gyro vertical within the attitude indicator, which is surrounded by a graduated sphere showing attitude.

The attitude indicator in Fig. 1 is of conventional form having a universally mounted graduated sphere 2 enclosing and stabilized by the gyroscope 4 to provide an artificial horizon showing both roll and pitch against graduations on the ring 6 surrounding the face of the housing 8. It is preferably equipped with a warning flag 10 to show power failure as described in the patent to Early, Jr., and Fitter, No. 2,734,279 dated February 14, 1956, which flag we also employ for the purpose of showing when the gyro is in the fast erection mode and, therefore, unreliable.

The gyro vertical proper 4 is provided with gravitationally responsive controllers such as liquid levels 12 and 14 about the roll and pitch axes and which respectively control the roll and pitch torquers 16 and 18 acting about axes at right angles to the respective axes of the liquid levels. An electrolyte or other conducting liquid is employed in the levels, each level having a central supply button 20, 20', a pair of upper contacts 21, 21' and 22, 22' on opposite sides of the normally central air bubble 23, 23'. When the gyro is level, no torque is exerted thereon because equal voltages are applied to the two ends of mid-tapped control windings 62, 62' of each torquer 16 and 18 as controlled by the leads from contacts 21, 21' and 22, 22' in the level, but this balance is disturbed when the bubble 23, 23' in the liquid interrupts the current flow through one of the two contacts through each liquid level and torquer so that a differential current flow takes place through winding 62 when the roll level 12 is tilted and through winding 62' when the pitch level 14 is tilted.

In the wiring diagram is shown three-wire, three-phase supply leads A, B and C for exciting and spinning the three-phase rotor 28 and operating the entire control system. When the main switch S is closed, full voltage is supplied to the polyphase rotor 28, the leads being shown as passing through coils 30, 31 and 32 on the small torquer or motor 34 for the power failure flag indicator 10. The flag is spring biased to the visible or warning position but on excitation of the coils 30, 31 and 32 it is moved out of view and becomes invisible.

Applicants prefer not to initiate the fast erection immediately upon closing of the main switch but to interpose a delay of a few seconds to give the gyro a chance to reach a fair speed and thereby prevent nutation. To this end, closing of the main switch S also starts to heat up the heating element 38 in the thermostatic time delay switch 40 which is connected across leads from the secondary of transformer 42. As the element 38 heats up, the thermostatic switch 40' is closed to set into operation applicants' fast erection system.

Closing of the switch 40' completes a circuit across the rectifier 44 and excites the magnet 46 to close the switch 48 of relay 50. This excites the magnet 52 of the master relay 54 and moves a plurality of switches from their normal position shown in the drawings to their alternate position to perform a number of functions in the system. First, excitation of the relay greatly increases or boosts the voltages supplied to the roll and pitch torquers 16 and 18 to establish a fast control from the liquid level devices 12 and 14. Secondly, it short circuits two of three polyphase windings 30 and 31 on the power failure motor 34 to cause the flag to appear, and third, it bypasses the turn cutout circuitry. The first main function is accomplished in part by the contact arm S1 of the relay 54 which breaks the low voltage supply from the tap 6' on the secondary of transformer 56 and connects to the end of said secondary to give an increased voltage to lead 58 which supplies a voltage to the leads 60, 61 to the mid-taps on the control field windings 62, 62' of the torquers 16 and 18 and also opens one end of the rectifier 64 in relay 80. Switches S2 and S3 of the relay 54 short circuit the flag motor windings 30 and 31, respectively, for the purpose above stated, and switch S4 provides a means for increasing the voltage supplied to the fixed fields 66, 66' of the torque motors by transferring the lead 68 from the secondary of transformer 42 to the C lead through leads 70, 72.

As the gyro rotor picks up speed, the current through the winding 32 falls. The falling off of the supply current reduces the voltage drop across the rectifier 44 so that magnet 46 releases switch 48. The opening of said switch, however, does not immediately deenergize the magnet 52 of the master relay 54 because we provide a holding switch 74 to maintain current through said magnet until the gyro is fully erected. For this purpose, switch 74 is shown as closed by the energization of the magnet 76 supplied direct current from bridge 78 connected across the field windings 62 of the roll torque motor 16. Said magnet 76 will, therefore, remain excited as long as any differential current is flowing through the control fields 62, that is, as long as the gyro is not erect in roll but will become deenergized when such differential current ceases and the gyro is erect in roll. The disabling means for the boosted erection mode of the gyro is accordingly dependent on a null output from the gravitationally responsive device controlling the roll torquer for operation. Therefore, at that time, switch 74 will be opened and the master relay 54 opened to restore normal erection. The opening of the master relay 54 removes the short circuits from windings 30 and 31 of the power failure motor 34 and the flag goes out of view indicating the completion of the quick erection cycle.

As intimated above, and as shown in the aforesaid prior application of J. M. Jessup, we provide a roll responsive switch 94 for rendering inoperative the erection torquers in case of continued roll in one direction of a magnitude sufficient to disturb the gyroscope which we have chosen to be about 6 degrees, but, as stated above, we prefer to delay the cutout of the erection device upon the instigation of a roll in order to prevent repeated interruptions of erection by the torquers when the craft is in rapidly reversing rolls which exceed 6 degrees in magnitude.

For the above purposes, we have shown a magnet 78' of relay 80 which is excited from the above described rectifier 64 as long as tilt responsive cutout switch 94 is conducting, that is, as long as the airplane is not banked more than about 6 degrees. When, however, the bank angle exceeds 6 degrees, magnet 78' is deenergized and switch S12 opens to break the circuit through a heating element of thermostatic delay relay 92. As the heater cools, thermostatic switch S14 opens after a predetermined delay of a few seconds and thereby breaks the circuit through lead 61 to the center taps of the control fields 62 and 62' of the torquers 16 and 18 thereby interrupting the erection of the gyro. Throughout normal operation, of course, master relay 54 is deenergized and the switches S1 and S5 are in the position shown in the drawings so that the gyro is normally in the slow erection cycle. When the gyro is in the quick erection cycle, switch S5 completes a circuit around S14 thereof so that at that time the quick erection device remains in operation even though the apparent bank angle exceeds 6 degrees.

We also prefer to provide means for quickly resetting the gyroscope at will so that in case the gyro becomes disturbed during flight it may be quickly erected at that time as well as during the starting up period. For this purpose, we provide a push button 82 connected in parallel with the switch 48 so that by closing this button the same function in the system may be accomplished as by the closing of switch 54, namely, the initiation of rapid erection and continuation thereof until the gyro is erected about the roll axis. This function is accomplished if the button 82 is pressed and released, but since the gyro may not be erected in pitch as soon as it is erected in roll the button 82 is preferably held closed until the gyro is erected in pitch.

While we have described our invention in its preferred embodiment, it is to be understood that the words which we have used are words of description rather than of limitation and that changes within the purview of the appended claims may be made without departing from the true scope and spirit of our invention in its broader aspects.

What is claimed is:

1. In a gyro vertical, an electrical torquer about each of the roll and pitch axes of the gyro, gravitationally responsive devices for controlling said torquers to erect the gyro at a normal rate, means for temporarily boosting the voltage supplied to said pitch torquer and said roll torquer to increase the rate of erection, and means dependent on a null output from the gravitationally responsive device controlling the roll torquer for disabling the erection boosting means for both torquers.

2. In a gyro vertical, for dirigible craft electrical torquers about the roll and pitch axes of the gyro, gravitationally responsive devices for controlling said torquers to erect the gyro, means responsive to a roll angle exceeding a predetermined small tilt for severing the control of said torquers from said devices to free the gyro, and means for delaying the operation of said severing means for a predetermined time period of continued bank of the craft in the same direction.

3. In a gyro vertical, electrical torquers about the roll and pitch axes of the gyro, gravitationally responsive devices for controlling said torquers to erect the gyro at a normal rate, means for temporarily boosting the voltage supplied to said torquers to increase the rate of erection, means responsive to a roll angle exceeding a predetermined small tilt for severing the control of said torquers from said devices to free the gyro, and means for disabling said severing means during the operation of said boosting means.

4. In a gyro vertical, a torquer acting about each of the roll and pitch axes of the gyro, gravitationally responsive means normally causing each torquer to apply a weak erecting torque upon tilt of the gyro about the affected axis, means for initiating an increase in the torques applied upon tilt for quick erection, and means operable under control of the gravitationally responsive means for the roll axis of the gyro when in erected condition operable to disable said torque increasing means.

5. In a gyro vertical, means for erecting the gyro about its roll axis including a gravitationally responsive device and a torque applying device, normally ineffective means for increasing the torque applied by the torquing device, means for conditioning said torque increasing means for operation, and means dependent upon the gravitationally responsive device with the gyro in an erected condition about its roll axis operable to disable said conditioning means and to restore the torque increasing means to normal condition.

References Cited in the file of this patent

UNITED STATES PATENTS

| 2,446,180 | Hoskins | Aug. 3, 1948 |
| 2,716,894 | Nichols et al. | Sept. 6, 1955 |